H. M. FRIENDLY.
METHOD OF TESTING ELECTRICAL CONDUCTORS.
APPLICATION FILED MAY 31, 1911.
1,081,300.
Patented Dec. 16, 1913.
2 SHEETS—SHEET 1.
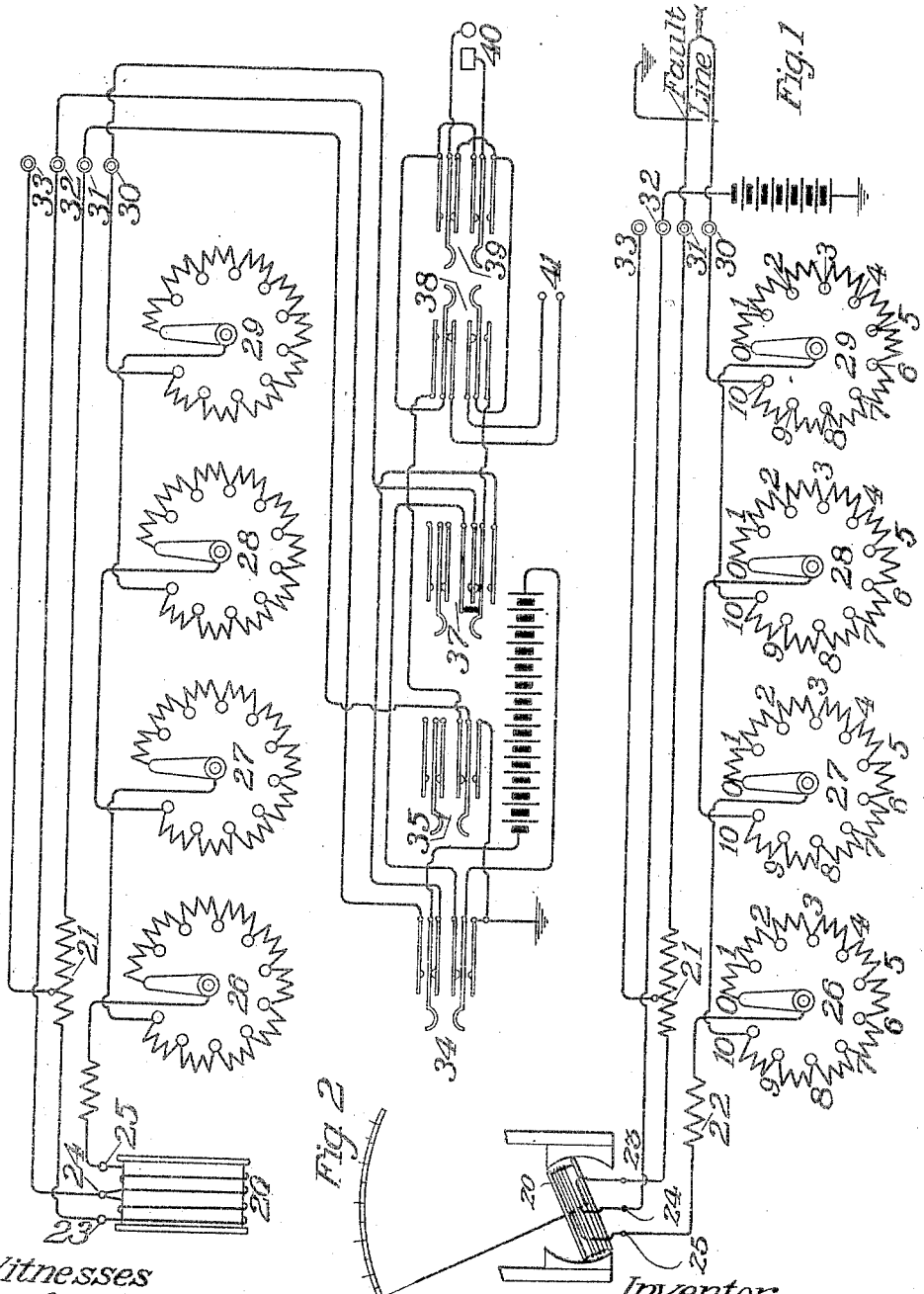
Witnesses
J. S. Baker
Leigh S. Keith
Inventor
Herbert M. Friendly
By McKeen & Miller
Attys H. M. FRIENDLY.
METHOD OF TESTING ELECTRICAL CONDUCTORS.
APPLICATION FILED MAY 31, 1911.
1,081,300.
Patented Dec. 16, 1913.
2 SHEETS—SHEET 2.
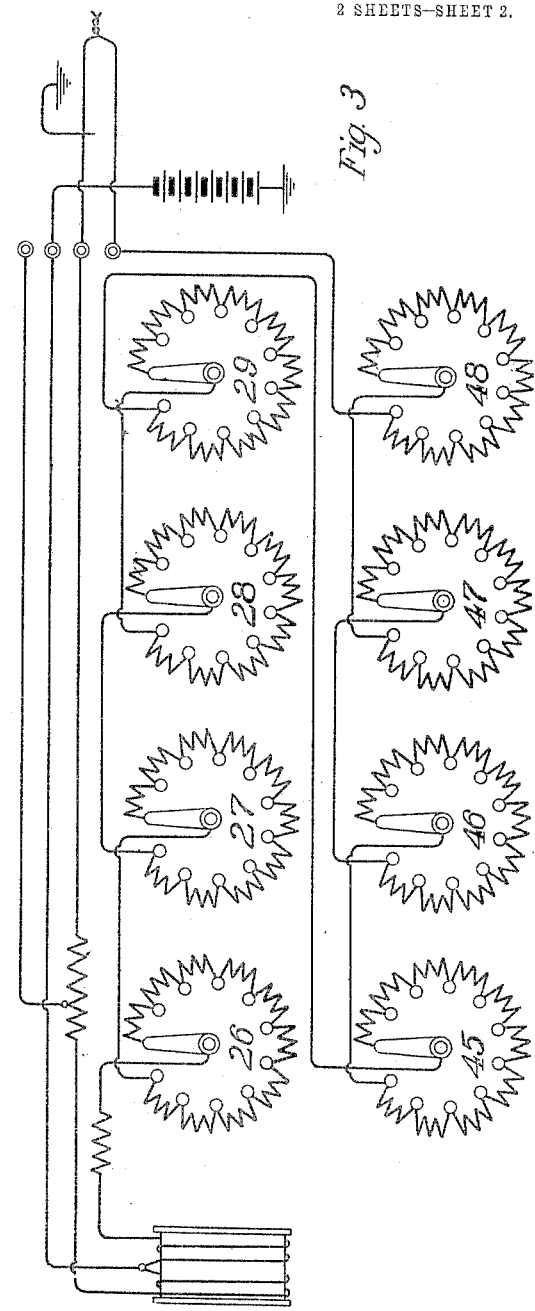
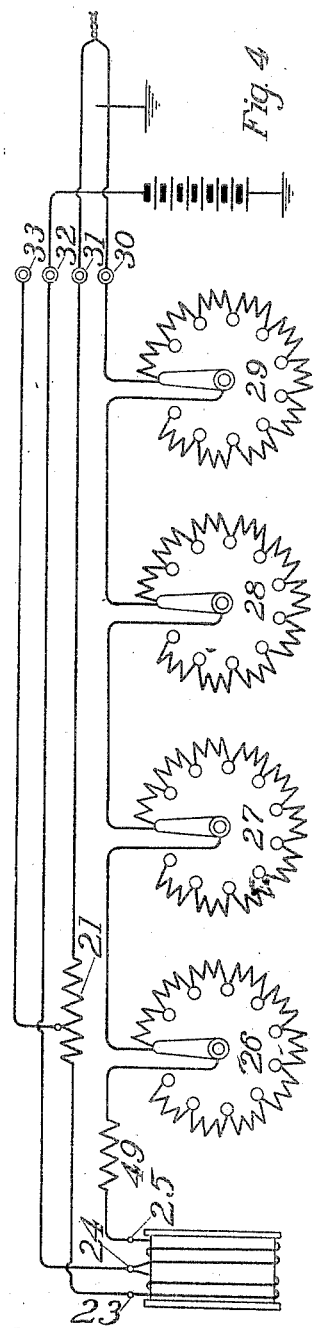
Witnesses
J. S. Baker.
Leigh S. Keith
Inventor
Herbert M. Friendly
By McMeen Mill
Attys

UNITED STATES PATENT OFFICE.

HERBERT M. FRIENDLY, OF PORTLAND, OREGON.

METHOD OF TESTING ELECTRICAL CONDUCTORS.

1,081,300.　　　Specification of Letters Patent.　　Patented Dec. 16, 1913.

Application filed May 31, 1911. Serial No. 630,533.

*To all whom it may concern:*

Be it known that I, HERBERT M. FRIENDLY, a citizen of the United States of America, and a resident of Portland, county of Multnomah, and State of Oregon, have invented a new and useful Improvement in Methods of Testing Electrical Conductors, of which the following is a specification.

My invention relates to improved testing devices and methods employed in measuring resistance and insulation and in the location of faults in elctrical conductors.

My improvement relates to that class of instruments which comprises voltmeters, galvanometers, or similar testing instruments, and is particularly adapted for general use in laboratory testing and for use by wire chiefs in telephone and telegraph service.

The principal object of my invention is the minimizing or total elimination of mathematical processes in determining resistance values, and especially the simplification of the process of determining the resistance of a conductor from the point of measurement to a point of fault, particularly where the resistance of the fault is unknown.

In some classes of work, such as in the maintenance of telephone exchanges, it is necessary that many conductors be placed under test daily. It is important that such work be conducted with the greatest possible rapidity, and therefore by the simplest and most direct methods and apparatus consistent with accuracy. The desirability of eliminating mathematical processes is obvious and the advantages of making the measurements by means of simple voltmeter readings rather than by the more elaborate Wheatstone bridge method of determination is equally apparent.

Voltmeters as commonly made have what may be called an active coil, which is usually, but not necessarily, movable, and which, due to the electromagnetic action set up by a current flowing in it, causes a certain movement of a needle or other indicator, the amount of this movement being dependent upon the strength of current flowing through the coil. The instrument is usually calibrated to read directly in volts or fractions thereof, although it is essentially a current measuring instrument. It is also customary to employ a resistance element within the instrument in series with the active coil or winding to reduce or restrict the amount of current that may flow through the instrument and for other reasons; and when this is done the instrument is so calibrated as to read directly in volts the electrical pressure or drop in voltage across the terminals of the combined active and inactive coils rather than across those of the active coil alone.

Ordinarily in voltmeters of this type the inactive resistance within the meter is definitely fixed at the time when the instrument is finally calibrated or if made adjustable at all is made to have several possible definitely fixed values so as to alter the significance of the scale readings and therefore increase the range of the instrument. By my invention I provide for a wide range of variable adjustment of the inactive resistance within the voltmeter, making it possible when the instrument is used in series with a given external resistance to substitute a variable internal resistance for the external resistance, or vice versa. I also divide the active coil of the voltmeter in such a manner as to make it particularly adaptable for the null or zero deflection method of measurements. By combining in a single instrument the direct deflection and the null or zero deflection methods, I am enabled, as I will point out, to arrive directly at the desired quantitative measurement without the use of mathematical formulæ or conversion tables.

Referring to the drawings which accompany this specification: Figure 1 shows in simplified form the circuit arrangement of one form of my testing apparatus as applied to fault location on a line; Fig. 2 shows the circuit of the same testing instrument arranged with a convenient grouping of keys for accomplishing the various desirable circuit changes; Fig. 3 shows a modification of my testing apparatus; and Fig. 4 a still further modification.

Referring to Fig. 1, 20 is the active coil of the voltmeter or equivalent measuring instrument. In order to adapt this instrument to null methods, I divide its active winding, preferably giving each division the same number of turns and also the same resistance, although obviously inequality in resistance might be compensated for by proper proportioning of the inactive resistances. The terminals of the active windings are indicated at 23, 24 and 25; 24 being that of the neutral point of the winding.

As already stated, it is usual to give voltmeters a higher internal resistance than is practicable to put into the active winding, and therefore extra or inactive resistances are used in series with the active winding. I divide this inactive resistance, placing one portion in the circuit on one side of the active winding, and the other portion on the other side. Where the active coil is equally divided as to resistance and number of turns, the two portions of the inactive winding are made equal. One-half of this inactive resistance is indicated at 21 and the other half is comprised in the fixed resistance 22, and the adjustable resistances in the form of rheostats 26, 27, 28 and 29. Resistances 21 and 22 are used in the calibration of the instrument before leaving the factory, and when finally adjusted at the factory may be considered as fixed in amount and unadjustable. With the rheostat arms each at zero there is the same total resistance value in each branch of the voltmeter circuit. That is, there is the same resistance between the point 24 and the binding post 31 as there is between the point 24 and the binding post 30. It is to be noted that in the arrangement of Fig. 1 the rheostat arms, when set at zero, include all of the rheostat resistances in their circuit, and that the adjustment of the rheostat arms to any other than the zero position serves to remove resistance from that branch of the circuit, the corresponding rheostat reading indicating the amount of removed resistance rather than the amount of included resistance.

The neutral point 24 of the active coil is brought out to a binding post 32, and, if desired, some intermediate point of the fixed winding 21 may be brought out to another binding post 33 so as to give the instrument, when used as a voltmeter, a double range of readings.

The voltmeter proper is preferably calibrated to read, directly in volts, the pressure across the binding posts 30 and 31 when all of the rheostat arms stand at zero, or, in other words, when all of the inactive resistance is included in circuit with the active coil. When so used the division of the active coil of the meter is without function, the two divisions acting together as a single cumulative winding. When the rheostat arms are adjusted to other than the zero position, the calibration of the instrument is, of course, altered, although it will be apparent that if there is included in the external circuit outside of the binding posts a resistance equal to that which has been cut out of the rheostat, the calibration will be unaffected with respect to the measurement of an external voltage. When such a voltmeter is connected in series with an external resistance and a source of electromotive force, the equation expressing the relation of the external resistance and the deflection for a given voltage is, neglecting the internal resistance of the source:

$$R = \frac{r(V-v)}{v}$$

where R is the external resistance; $r$ the resistance of the testing instrument; V the voltage of the source; and $v$ the resulting reading of the instrument. The internal resistance of the source of electromotive force, which is usually a battery, may, for practical purposes, be neglected without appreciable error. Thus, as is well known, it is possible to calculate the resistance of a circuit under observation if the impressed voltage, the internal resistance of the instrument and the deflection be known. The voltmeter is extensively used for this and similar purposes in connection with apparatus and circuits, and, as ordinarily made, is a valuable aid in determining the existance, character and location of faults. My improvement does not impair or limit their usefulness in tests usual with such instruments, but it does extend their adaptability to the execution of tests not made before by voltmeters or instruments of that class.

To illustrate the operation of my invention, it will be assumed that it is desired to locate a ground fault on a loop conductor. This loop may be an ordinary metallic circuit pair with a fault or partial ground on one side, or it may be formed by a faulty wire looped together with a good wire. In either case the condition is that represented at the right of Fig. 1. The loop to be tested is connected, as shown in Fig. 1, to the binding posts 30 and 31, the test battery being connected between the binding post 32 and the ground. Under these conditions, current will flow from the battery through the two active windings of the voltmeter in multiple, through the two branches of inactive winding in multiple, and through the two portions of the loop in multiple to ground at the fault. The fault is thus a part of the path common to the two branches over which this current flows. Resistance is then removed from the rheostat by turning to the right the various arms until the needle or indicator of the voltmeter returns to zero. When this condition is reached, assuming that the voltmeter windings are equally divided, there will be the same flow of current through each of the active windings, these currents opposing and neutralizing each other's effects, and therefore producing no movement of the needle. When this equalization of current between the two limbs has been attained, it follows that an equalization of resistance in the two limbs from the battery to the fault has been attained, that is, with the rheostat so adjusted the resistance from the point 24 to the fault is the same in each path. It is to be noted that the indication of the rheostat will be, not how much resistance is included in the rheostat, but how much has been removed from it. This removed resistance, so indicated, will equal the resistance in the loop under test from the point of fault on the faulty wire to the point on the good wire the same in resistance from 30 as the fault is from 31. If the good and the faulty wires are of the same resistance per unit length and the distant ends of the two wires are joined without resistance, the amount so cut out by the rheostat and indicated by it will be the resistance of the remote end of the loop from the fault to a point on the good wire which is the same distance from 30 as the fault is from 31. In other words, assuming uniform and equal resistance per unit length of the two wires and assuming that they follow the same route, as is usually the case, the resistance so cut out from the rheostat will be that of the remote end of the loop from the fault to a point on the good wire opposite the fault. From this it follows that one-half of the rheostat reading will be equal to the resistance of one wire from the fault to the distant end, or, the whole rheostat reading will be equal to the loop resistance from the fault to the distant end. From these considerations it follows that the amount of resistance cut out to cause a zero reading of the instrument is equal to the total resistance of the loop under test minus twice the resistance of one wire from the instrument to the fault. If now, by suitable switching arrangements, the battery be disconnected from the ground and from the center point of the voltmeter winding and, instead, be connected in series in the circuit which includes the testing instrument and the loop under test, leaving the rheostat with the adjustment attained in the first test, the deflection method of observation rather than the null method may be practised. It is to be remembered that the voltmeter is calibrated so that its readings will have a certain known significance when all of the rheostat resistance is included in the internal circuit of the instrument as a part of the inactive winding. But a part of the rheostat resistance has been removed and the amount that has been removed is, as has been stated, equal to the resistance of the remote end of the loop from the fault to a point on the good wire, the same in resistance from 30 as the fault is from 31. Therefore, the deflection of the instrument under the new condition will be the same as that which would be obtained with the normal voltage and the normal position of the rheostat in series with an external resistance equal to twice that of one wire from binding post 31 to the fault. This reading, therefore, if applied to the equation above mentioned, will give twice the resistance of that portion of the faulty wire from the testing instrument to the fault. Obviously all mathematical computation may be avoided by marking the scale of the voltmeter so that the position of the pointer will indicate directly the amount of resistance in the circuit in excess of the normal internal resistance of the instrument, or of even greater convenience, indicate directly just one-half that amount. In this latter case the voltmeter reading would show directly the resistance on the faulty wire from the test instrument to the fault. Carrying this idea of special calibration still farther, the voltmeter scale might be so marked as to indicate directly in feet, or other unit of length, the distance from the instrument to the point of fault, in accordance with one or more of the most commonly used sizes of conductor.

The method just described involves the employment of the null or zero deflection method to determine the amount of resistance in the remote end of the loop, i. e., the portion of the loop beyond the fault; and then the direct deflection method, substituting the previously ascertained resistance of the remote end of the loop for a portion of the internal resistance of the voltmeter, so that the resistance of the near end of the loop may be directly determined.

The instrument is capable of the following alternate method of use: With the line to be tested connected as shown in Fig. 1, the battery is applied between ground and the binding post 32 as before. Resistance is then cut out of the rheostat until there is zero deflection of the indicator. The amount of resistance so cut out (the resistance of the remote end of the loop) is noted, and the rheostat arms are returned to normal so as to include all the rheostat resistance. The connections are then changed so as to include the battery in series in the circuit under test, the ground connection being broken. Resistance is again cut out of the rheostat until a deflection is attained equal to that which would be produced were the battery placed directly across the terminals 30 and 31 with the rheostat resistance normal. Obviously the amount of resistance cut out of the rheostat in this case is equal to the loop resistance of the entire loop under test, since the line loop has simply been substituted for an equal amount of rheostat resistance. By subtracting the first reading of the rheostat from the second, a result is secured which is twice the resistance from 3 to the fault, or if both wires are of equal resistance per unit length, is equal to the loop resistance to the point of fault. This method, it is seen, involves the employment of the null or zero deflection method to determine the amount of resistance in the remote end of the loop and then the direct deflection method to determine the entire loop resistance, the resistance of the near end of the loop being determined by subtraction.

In order to further facilitate the determination, a second rheostat may be provided in series with the first, as shown in Fig. 3. The rheostat adjustment in the first operation would be retained during the second operation, which latter would be made by means of the added rheostat units 45, 46, 47 and 48. If the first rheostat be left at the adjustment secured by using the null method, this representing the resistance of the remote end of the loop, then when the second adjustment is made with the second rheostat, the sum of the two rheostat readings will represent the total resistance of the loop, and the second rheostat alone will therefore represent the resistance of the nearer end of the loop; that is, the resistance of the loop between the binding posts of the instrument and the point of fault. This second rheostat may be graduated to indicate one-half the resistance that is cut out of it, and therefore afford a direct reading of the resistance of one wire of the loop from the point of test to the fault. Similarly it may be graduated to indicate distances on a given size of line wire. It is to be borne in mind that the total amount of resistance cut out in order to obtain the second adjustment, that is, the combined resistance cut out of the two rheostats, will always be equal to or greater than the amount cut out to obtain the first balance. It will be equal only when the fault is at the terminal of the instrument, an improbable condition.

In lieu of using the two independent rheostats in series as just described, a rheostat, such as is shown in my application, Serial Number 378,196, may be used. This is a single rheostat, having at least nineteen unit steps for each arm, and provided with a movable scale graduated from zero up. With this arrangement the zero graduation of the movable scale is moved opposite the rheostat arm pointer at the position of first setting, and the second reading is taken starting from this first setting as a new starting point, thus ignoring the stationary or absolute graduations and reading the second or final value from the movable scale. This second or final value then denotes the difference between the first reading and the actual or absolute value as read from the stationary scale.

Terminal 33 is shown tapping the resistance 21, so that, if desired, the internal resistance of the instrument may be reduced, thus giving the voltmeter scale divisions a different significance, as is common practice in ordinary voltmeters. A switch may be associated with resistance 21 and also with the highest rheostat decade to reduce the resistance 21 and the resistance adjacent to 25 simultaneously to various values as may be indicated by the switch designations. The object of this provision is to make the instrument more nearly universally adaptable to all required uses. For instance, in the null method of observation, with the battery applied between the point 24 and ground, the balancing of the resistances when a low resistance line is under test will be more readily accomplished if the internal resistance of the instrument also is low.

Fig. 4 shows a modification in which the resistance 49 comprises the entire normal resistance between points 25 and 30. In other words, the rheostat decades in their normal positions include no resistance, but act as in an ordinary rheostat to cut in resistance in amounts as indicated by the positions of the arms. In this case with the rheostat at normal or zero position, the resistance 49 is in itself a balance to the resistance 21 with respect to the active windings of the voltmeter when connected for null methods.

The instrument thus arranged may be used as follows: To locate a fault on a wire of a pair, the faulty wire is connected with binding post 30 and the good wire with 31. With battery applied between post 32 and ground, as shown in Fig. 4, a balance is obtained by cutting resistance into the rheostat. Obviously in this case the resistance cut in to secure a balance is equal to the resistance of the portion of the circuit beyond the fault, that is, of the remote portion of the circuit from the fault on the faulty conductor to a point on the good conductor equal in resistance from 31 as the fault is from 30. Noting this resistance, a new test is made by applying battery in series with the instrument and the loop under test and noting the deflection while the rheostat arms are at normal. Then with the binding posts 30 and 31 short-circuited, the rheostat is adjusted until the same deflection is obtained as that through the loop. This latter rheostat reading will indicate the total resistance of the loop. The amount of resistance first introduced, in applying the null method, subtracted from this latter indication, will give a value twice that of the resistance to the fault on the faulty wire, since it is the difference between the total resistance of the loop and that of the remote section of the loop.

It is obvious that if the instrument connected and arranged as shown in Fig. 1 be provided with a set of reverse rheostat markings, then that arrangement is capable not only of the methods of operation already attributed to it, but also of the method just described for the arrangement of Fig. 4. By reverse rheostat markings is meant numbering the contact studs from zero to ten in the reverse direction from that indicated in Fig. 1. In this case one set of markings would be as indicated on Fig. 1 and each number in the reverse set would be the difference between ten and the marking shown. Thus the stud marked 10 would also be marked 0; stud 9 would also be marked 1, and so on, the sum of the two markings always being ten. These reverse designations may be placed on the inner side of the circle of the studs. If then the contact arms be placed opposite the respective zeros of the null scale, the rheostat would include no resistance and by revolving the arms in a counter-clock-wise direction, resistance would be cut in, as described in connection with Fig. 4, and the position of the arms would, by the inner set of markings, always indicate the amount of resistance included, just as by the outer set of markings they would indicate the amount of resistance excluded. To give the instrument a wider range, the resistance 22 of Fig. 1 may have in series with it a normally short-circuited resistance equal to the total resistance of the rheostat. Then if the rheostat is to be cut out, or worked from zero resistance up, as in Fig. 4, this short-circuit around the resistance associated with 22 may be removed, thus giving the required balance between the two sides of the circuit when the rheostat resistance is at zero.

The switching arrangements which I have shown in Fig. 2 are those which I have found convenient for making the desired circuit changes described with the necessary rapidity. The exact switching mechanism to be employed is subject to a wide degree of variation, both as to circuit arrangement and mechanical construction. In the arrangement shown, key 39 is a reversing key capable of reversing the line connections with respect to the instrument circuits. The plug 40 is for convenience in connecting the terminals of the testing and switching apparatus with the terminals of the line to be tested, it being assumed in this case that the tested line ends in a spring-jack as in telephone practice. Key 38 is designed to connect this plug to other leads 41, so as readily to connect a telephone or a calling generator or other apparatus with the line. With the long springs of key 38 in contact with the corresponding outside springs, the voltmeter is placed in series with the plug, and therefore with the connected line. Key 35 is adapted to apply the voltmeter in series with the battery between the tip of the plug and the ground (keys 37 and 38 being held depressed at the same time). Depressing keys 38 and 34 applies the live pole of the grounded test battery through the center point of the active winding, the path then dividing between the rheostats 26, 27, 28 and 29, and the resistance 21. Simultaneously depressing keys 38 and 37 connects the battery in series with the two windings of the voltmeter and the inactive resistances, making the instrument available for direct deflection readings through the circuit connected with the plug.

The arrangement shown is typical of many that might be devised for conveniently making the circuit commutations necessary for the application of my method of testing.

Having thus described my invention, what I claim as new and desire to secure by United States Letters Patent is:—

1. In a testing instrument, a pair of line terminals; an active meter winding having two sections connected in series; a resistance connected between one of said line terminals and one side of said meter winding; an adjustable resistance between the other of said line terminals and the other side of said meter winding; a source of current; circuit conductors, and a switching device adapted to connect said source alternately for differential current flow through the two sections of said active winding for null methods of observations, and in series with said active winding and said resistance for direct deflection observations.

2. In a testing instrument, a pair of line terminals; an active meter winding having two sections; a fixed resistance on one side and an adjustable resistance on the other side of said meter winding, said winding and resistances being connected together in series between said line terminals; a source of current; circuit conductors, and a switching device adapted to connect said source alternately for differential current flow through the two sections of said winding in multiple for null methods of observations, and in series with said winding and said resistances for direct deflection observations.

3. In a testing instrument, a pair of line terminals; an active meter winding having two sections; a fixed resistance on one side and an adjustable resistance on the other side of said meter winding, said winding and said resistances being connected together in series between said line terminals; a ground terminal; a source of current; circuit conductors, and switching devices adapted to connect said source alternately between said ground terminal and the point of intersection of said meter windings for null methods of observation, and in series with said winding and said resistance for direct deflection methods.

4. In a testing instrument, an active meter winding; a fixed and an adjustable resistance connected in series with said winding on opposite sides thereof; means for connecting said winding and said resistances in series across the two terminals of a faulty circuit to be tested; a source of current, and means for alternately connecting said source of current in series with said meter winding and resistances for direct deflection observations, and between an intermediate point in said meter winding and ground for null methods of observation.

5. In a testing instrument, an active winding; a fixed and an adjustable resistance connected in series with said winding on opposite sides thereof; means for connecting said winding and said resistances in series across the two terminals of the circuit to be tested; a source of current; switching devices for alternately connecting said source of current in series with said meter winding and resistance for direct deflection observations, and means for alternately connecting said source between an intermediate point in said meter winding and a third conductor for null methods of observation, the two resistances on the two sides of said meter winding being so proportioned to each other and to the respective sections of the active winding as to produce a balance with respect to the differential flow in the portions of said active winding when said adjustable resistance is in its normal condition and when no external resistance is in circuit.

6. In a testing instrument, an active meter winding having two sections; a fixed resistance on one side of said meter winding and an adjustable resistance on the other side of said winding; a source of current; and switching means for connecting said source of current, said meter winding and said resistances in series with the two wires of a faulty circuit under test and for alternately connecting said source of current between a third conductor and the intersection of said meter winding sections.

Signed by me at Portland, county of Multnomah, and State of Oregon, in the presence of two witnesses.

HERBERT M. FRIENDLY.

Witnesses:
E. J. BRENNAN,
M. S. FRIENDLY.